March 18, 1969     C. D. SNELLING     3,433,929
CONTROL DEVICE
Filed April 10, 1967
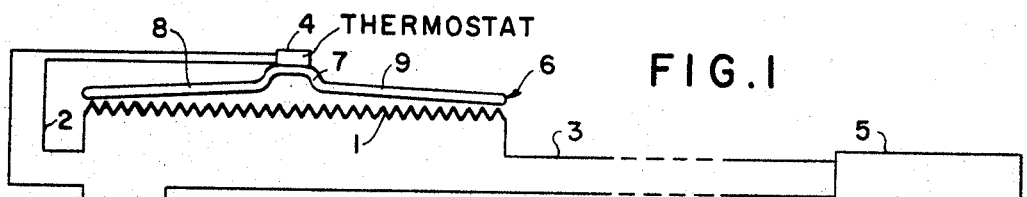
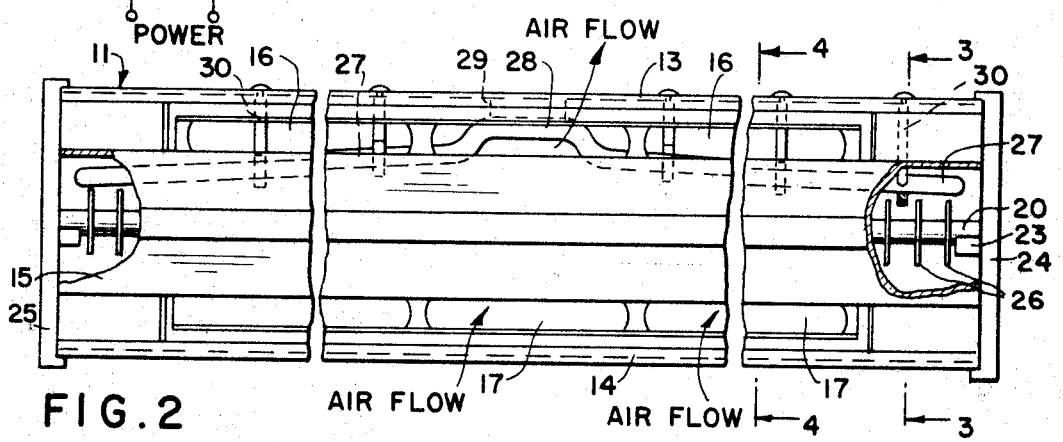
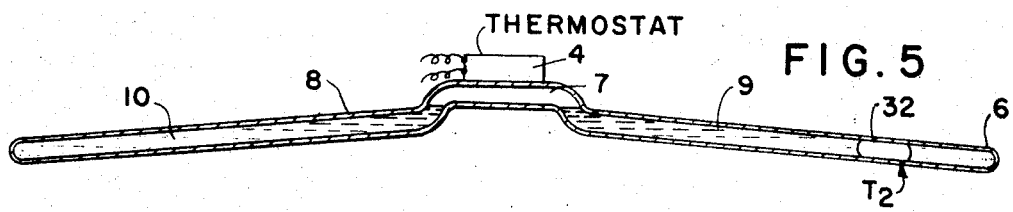
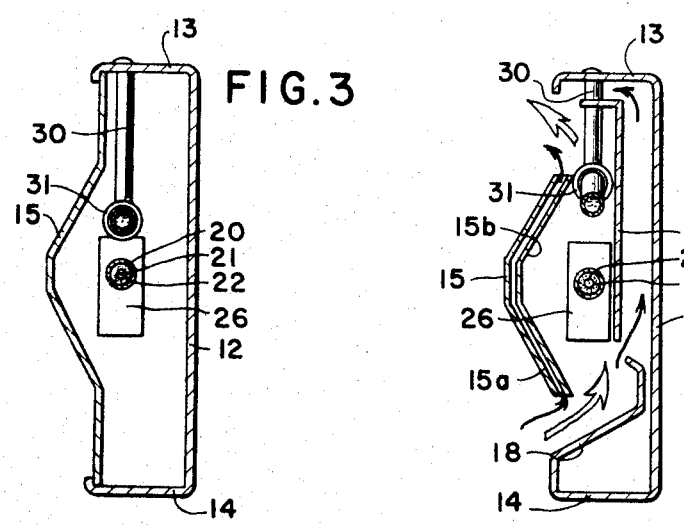
INVENTOR:
CHARLES D. SNELLING
BY
ATTORNEYS United States Patent Office 3,433,929
Patented Mar. 18, 1969

3,433,929
CONTROL DEVICE
Charles D. Snelling, Allentown, Pa., assignor to Minnesota Mining and Manufacturing Company, St. Paul, Minn., a corporation of Delaware
Continuation-in-part of application Ser. No. 334,390, Dec. 30, 1963. This application Apr. 10, 1967, Ser. No. 648,508
U.S. Cl. 219—363　　　　　　　　　　　　9 Claims
Int. Cl. H05b 3/14

ABSTRACT OF THE DISCLOSURE

An over-temperature detection device employs a hermetically sealed detector tube nearly filled with a volatile liquid and sloping upwardly from the detection area to a high point where it contacts a thermostatic control.

Background of the invention

This application is a continuation-in-part of my copending application Ser. No. 334,390, filed Dec. 30, 1963, now abandoned.

This invention relates to devices for the sensing, regulation or control of temperature. In one important aspect the invention relates to an over-temperature detecting device for use with baseboard heaters or similar heating units.

The use of electrical energy as a source of heat in the home has led to the development of small compact baseboard units, so called because they are adapted to be mounted against the baseboard of a wall of a room to be heated. Like the baseboard, the unit is longitudinally configurated. It comprises a longitudinal hollow casing and has enclosed therein an electric heating element disposed longitudinally of the casing and connected to an electrical circuit in the usual conventional manner. The baseboard heating is generally automatic and is controlled by a thermostat strategically located in a room or other area being heated. Such heaters may be 6 inches high, about 2¾ inches deep and anywhere from 2 to 8 feet long. The heating element may comprise the usual 80 nickel-20 chromium electrical resistance heating element completely enclosed within a metal sheath, e.g. a tube, the heating element being buried within an insulating material, such as powdered magnesia, or the like, for example similar to a Calrod unit.

It is usual for the heating elements to be surrounded with heat exchanger fins in order to assure optimum delivery of heat to the surrounding environment by the convection principle. Generally, the front of the unit is suitably louvered or vented to promote a natural draft through the unit while at the same time being designed to shield the electric resistance element from accidental touching by human hands.

In connection with heating units of the vented type, which are in increasing use in homes, factories, offices, showrooms, and the like, a need has arisen for some kind of protection or control, in addition to the room thermostat, against thermal overheating of the electric resistance heating element. Such overheating may occur through inadvertence when some or all of the vents become obstructed so that air is prevented from entering a part or all of the heater to remove the heat generated.

In normal operation, the amount of heat removed from an electric resistance element by air flowing around it is substantially equal to the amount of heat generated. The unit is designed so that the circulating air arising from the natural draft effect of the vents in the unit is sufficient to remove the heat generated and maintain a steady state with respect to the temperature of the heat resistance element, since the amount of heat delivered to the unit is a constant or nearly so and is determined by the electrical capacity of the system.

However, when a part or nearly all of the ventilation space or louvers or openings of a heating unit accidentally become obstructed, the heat in the obstructed area or areas is not removed at the rate for which the unit is designed such that the temperature in the obstructed areas may rise to abnormally high levels. For example, the temperature within the unit which may generally be in the order of 200° to 300° F., may rise to as high as 800° to 900° F. or higher. In the absence of a suitable protective device, such temperature rises may cause damage to, or charring or ignition of, nearby flammable materials, as, for example, carpets, drapes, paper, or curtains.

Many methods have been employed to provide some measure of thermal protection. One method is to employ a thermostat somewhere in the unit. However, the use of a single thermostat has its limitations in that it only reacts to a temperature variation within the immediate vicinity of its physical location. Thus, if the thermostat is in the middle of an 8-foot unit, an obstruction to heat transfer by convection a foot away from the thermostat might very well generate an abnormally high temperature condition in that location without it being detected by the thermostat. To insure adequate protection would require, let us say, placing a thermostat along every 6 inches of length of the baseboard. As will be apparent, this would make the cost of baseboard heaters economically prohibitive.

Summary of the invention

The present invention makes possible the detection of an over-temperature over all or any portion of a heating zone, by means of a single thermostat or other temperature detection or control device employed in combination with a novel pick-up device comprising a tube of heat conductive material having a vaporizable fluid hermetically sealed therein and disposed at an angle to the horizontal along the heating zone, the thermostat or equivalent being in heat conductive relationship with the higher portion of said tube.

As applied to an electric baseboard heater installation the over-temperature detector provided by my invention may comprise a tube which runs generally horizontally and substantially the length of the heating element to be protected. The tube is hermetically sealed and is filled almost completely with a suitable vaporizable heat transfer liquid, with the balance of the volume of the tube occupied by the vapor of the fluid. Depending upon the application, a suitable heat transfer fluid may be such fluids as "Freon 11" and "Freon 113" chlorofluorocarbon liquids, alcohol, or other similar fluids, and even in special cases, water. The tube should be made of thin-walled heat conductive metal such as aluminum, copper, steel and the like. The tube should be hermetically sealed so that it contains only the heat transfer fluid and its vapor. A thermostat is employed in heat conductive combination with the tube. Wherever the thermostat is located, it is essential that the tube be so arranged that the thermostat is located at the highest part of the tube when the device is in operation. Broadly, the tube relative to the heating element has a higher portion and a sloping lower portion with a thermostat in heat conductive relationship with the higher portion and electrically coupled to the circuit of the heating element.

Depending on the particular application, the tube may be straight or slightly arcuate, and disposed in a generally horizontal direction with one end or a central portion higher than the remainder; or it may be disposed in a generally vertical position, or at any intermediate slope. In all cases the thermostat or equivalent device is placed at the highest point of the tube, at which any bubbles of vapor formed within the tube will collect and condense.

In a preferred embodiment as applied to baseboard heaters, the tube utilizes a bend intermediate its ends, with the tube portions on each side of the bend sloping downward towards gravity away from the bend.

BRIEF DESCRIPTION OF THE DRAWING

In the drawing:

FIGURE 1 shows schematically the electrical circuit of an electrical resistance heating element in combination with the over-temperature detector provided by the invention;

FIGURE 2 depicts in elevation one embodiment of a baseboard heater utilizing in combination therewith the over-temperature detector of the invention;

FIGURES 3 and 4 are side elevations of the baseboard heater shown in FIGURE 2 as taken along lines 3—3 and 4—4, respectively; and FIGURE 5 shows a hot spot or over-temperature detector illustrating the principle by which it works.

DESCRIPTION OF THE PREFERRED EMBODIMENT

Referring to FIGURE 1 of the drawing, I show somewhat schematically an electrical resistance heating element 1 coupled to lines 2, 3 which in turn are connected to a source of power. Thermostats are provided coupled to the circuit, a thermostat 4 being provided associated with the detector coupled to line 2 and a thermostat 5 disposed remotely from the heating device coupled to line 3. The over-temperature detector 6, located adjacent and above the heating element, comprises a tube having preferably a bend 7 from which legs 8 and 9 slope downwardly as they span substantially the length of the heating element. The tube is almost completely filled with a heat transfer fluid 10 while leaving room for a vapor pocket at the bend of the tube where super-heated vapor collects and condenses to release its latent heat to thermostat 4.

The hermetically sealed fluid is chosen so that it will have an operating pressure within a reasonable range, will not solidify within the operating ranges, will have adequate chemical stability, and will exhibit noncorrosive characteristics as well as good heat transfer properties. The inside diameter of the tube may be in the neighborhood of about ⅛ to ¼ of an inch in diameter. Whatever the diameter, it should be large enough to allow for unobstructed flow of bubbles of gas through the tube and yet small enough consistent with maintaining thermal inertia to a minimum. Experience has shown a diameter of 3/16 of an inch to be quite adequate in the illustrative application described.

Referring to FIGURES 2 to 4, I show a portion of a convection type baseboard heater comprising an elongated housing designated generally by the numeral 11 having a back 12 for mounting against the base of a wall, top and bottom flanges 13 and 14, respectively, integral with the back side and a grill 15 on the front side thereof, said grill having top and bottom vents 16 and 17, respectively, which cooperate with other elements within the housing to provide a convective flue for air flow into and out of the baseboard heater as shown in FIGURE 4.

Referring to FIGURE 4, which is a transverse section taken along line 4—4 of FIGURE 2, bottom flange 14 is shown integral with back side 12, the flange terminating into a bent portion 18 which extends inwardly of said housing to provide a convection path rearwardly of a partition 19 which is configured as an inverted L section extending longitudinally of said housing between the back side thereof and grill 15.

Grill 15, forming the front face of the baseboard heater shown in FIGURE 4 comprises two spaced-apart elements 15a and 15b designed to provide a path for the flow of air therebetween to keep the front grill portion from overheating. On FIGURES 2 to 4, the heating element is shown as comprised of a metal tube 20 (e.g., a Calrod unit) having an electrical resistance heating element 21 embedded in insulating material 22, such as powdered magnesia, the heating element being suitably connected at its end to an electrical circuit. The tubular member containing the heating element is supported at its opposite ends by a U-shaped saddle or cradle 23 fixed to end walls 24 and 25 (note FIGURE 2). Heat exchanger fins 26 of aluminum or other heat conductive metal are provided spaced along the tubular member.

The hot spot detector in the form of a hermetically sealed tube 27 is mounted within the housing of the baseboard heating element with its intermediate bend portion 28 disposed near the top 13 of the baseboard in heat conductive contact with thermostat 29 also mounted in the baseboard. The hot spot detector is mounted via a series of suspension supports 30 having an eye 31 of insulating material through which the legs of the hot spot detector tube pass (note FIGURES 3 and 4). As will be observed in FIGURE 2, the hot spot detector is supported directly above the Calrod unit and in proximal relation thereto.

Assuming in actual operation that the baseboard unit is about 6 feet long and normally operates at an air outlet temperature of about 200° F., the thermostat in contact with the highest point of the hot spot detector tube is set at about 250° F. Assuming further a normal unimpeded draft of air through the unit, the entire heat-sensing tube, including the thermostat associated therewith, will reach a steady state temperature condition of about 200° F. Now if, through inadvertence, the last 6 or 12 inches of the louvered or vented heater is blocked, the air temperature in that area begins to rise. Referring to FIGURE 5, the temperature rises in the stated area to a level of $T_2$, for example 350° F. This rise in temperature causes the heat transfer liquid in the sensing tube to boil at that point and form a superheated vapor bubble having a temperature in excess of 250° F. Since the leg 9 of the sensing tube is sloped gently upward, the generated vapor in the hot spot rises to the high point of the tube which is at the bend 7 and condenses, releasing its latent heat of vaporization. The temperature at the bend of the tube will rise accordingly. As the boiling continues at the hot spot, more heat is transferred to the bend of the tube and thence to thermostat 4. When the temperature of the thermostat finally exceeds 250° F., the heating unit is turned off until the temperature of the thermostat drops below 250° F. By having the bend intermediate the ends of the sensing tube, the heat from the hot spot, no matter where it happens to be located, will always be directed from either leg of the tube to the thermostat located at the bend.

In a test with a baseboard unit, a vent blocked with a cotton cheesecloth showed slight discoloring of the cheesecloth within 10 minutes. When the hot spot detector was used, under the same conditions, the heating device was turned off within 6 minutes before the cheesecloth began to discolor. Temperatures were observed to rise to 600° F. or more in the region where the vent was blocked. However, with the hot spot detector the temperature was maintained at a safe maximum of 250° F.

While a thermostat is used in heat-conductive combination with the heat-sensing tube (thermostat 4 shown in FIGURE 1), it will be appreciated, depending upon the heating requirements, that another thermostat may be used remotely situated from the baseboard heating element, such as thermostat 5 shown in FIGURE 1. Thermostat 4 in effect monitors the baseboard heater in the event it behaves abnormally, while thermostat 5 turns the heater on or off depending upon the heat requirements of the space to be heated surrounding the heating unit.

Although the device of the present invention is particularly useful as an over-temperature sensing and control device for electrical baseboard heaters, it is to be understood that modifications and variations may be resorted to for this and other uses without departing from the spirit and scope of the invention. As an example, steam-heated or direct-fired baseboard heaters, radiators, or other heater mechanisms which are susceptible of control through electrically operated valves or other means may be protected against local overheating. Temperature sensing or control at remote locations and without electrical connection to the heated area represents another field of utility. These and other modifications and variations are to be considered as coming within the purview and scope of the invention and the appended claims.

What is claimed is as follows:

1. A temperature sensing device comprising a hermetically sealed tube of heat conductive material for disposal at an angle with the horizontal, temperature sensing means in heat conductive relationship with said tube at the highest portion when so disposed, and vaporizable heat transfer liquid filling said tube almost completely except for a vapor pocket, so that bubbles of vapor created within said tube will rise through said liquid in and along said tube to said highest portion.

2. The device of claim 1 wherein said temperature sensing means is a thermostatic control device.

3. The device of claim 1 in combination with a source of heat with said tube disposed at an angle with the horizontal and in position to receive heat from said source at least at a portion removed from said highest portion.

4. The combination of claim 3 wherein the temperature sensing means is a thermostatic control device for controlling the output of heat from said source.

5. In combination with an electric resistance heating element coupled to a circuit, an over-temperature detector comprising a length of tube of heat conductive material having a vaporizable fluid hermetically sealed therein, said tube running in a generally horizontal direction adjacent to and spanning substantially the length of said electric heating element, the tube having a higher portion and a sloping lower portion in said horizontal direction, and a thermostat in heat conductive relationship with the higher portion and electrically coupled to the circuit of said heating element.

6. In combination with an electric resistance heating element coupled to a circuit, an over-temperature detector comprising a length of tube of heat conductive material having a vaporizable heat transfer fluid hermetically sealed therein, said tube running in a generally horizontal direction adjacent to and spanning substantially the length of said electrical heating element, the tube having a bend intermediate its ends with the tube portion on each side of the bend sloping downward therefrom, and a thermostat in heat conductive relationship with the tube at the bend and electrically coupled to the circuit of said heating element.

7. The combination, with an electrical resistance heating element coupled to a circuit, of a heating unit having a first thermostat cooperably associated therewith but situated remotely from said unit for controlling the temperature of the immediate environment of said unit, an over-temperature detector comprising a length of tube of heat conductive material having a vaporizable heat transfer fluid hermetically sealed therein, said tube running in a generally horizontal direction adjacent to and spanning substantially the length of said electrical heating element, the tube having a bend intermediate its ends with the tube portion on each side of the bend sloping downwardly therefrom, and a second thermostat in heat conductive relationship with the tube at the bend and coupled to the circuit of said heating element circuit.

8. The combination with a baseboard heater comprising a longitudinal casing having a length of an electrical resistance heating element coupled to a circuit supported within and along said casing, an over-temperature detector comprising a length of tube of heat conductive material having a vaporizable heat transfer fluid hermetically sealed therein, said tube running in a generally horizontal direction adjacent to and spanning substantially the length of said electrical heating element, the tube having a bend intermediate its ends with the tube portion on each side of the bend sloping downwardly therefrom, and a thermostat in heat conductive relationship with the tube at the bend and coupled to the circuit of said heating element.

9. In a baseboard heater comprising a longitudinal casing having a length of an electrical resistance heating element coupled to a circuit supported within and along the casing and a first thermostat cooperably associated with but situated remotely from said heater for controlling said heater in accordance with the heating requirements of the immediate environment of said heater, the combination of a hot spot detector comprising a length of tube of heat conductive material having a vaporizable heat transfer fluid hermetically sealed therein, said tube running in a generally horizontal direction adjacent to and spanning substantially the length of said electrical heating element, the tube having a bend intermediate its ends with the tube portion on each side of the bend sloping downwardly therefrom, and a thermostat in heat conductive relationship with the tube at the bend and coupled to the circuit of said heating element.

References Cited

UNITED STATES PATENTS

| | | | |
|---|---|---|---|
| 1,174,714 | 3/1916 | Harrison et al. | 219—341 X |
| 1,258,231 | 3/1918 | Lucas | 219—341 |
| 1,507,985 | 9/1924 | Brown | 219—341 X |
| 3,177,931 | 4/1965 | Carruthers | 219—341 X |

RICHARD M. WOOD, *Primary Examiner.*

C. L. ALBRITTON, *Assistant Examiner.*

US. Cl. X.R.

219—322, 341, 365, 481; 165—105